H. MAYER.
WHEEL.
APPLICATION FILED NOV. 5, 1908.

952,012.

Patented Mar. 15, 1910.
2 SHEETS—SHEET 1.

Witnesses:
John Bayle
Edgar V. Jacobs

Inventor:
Henry Mayer
By Ralph Kalish
Atty.

H. MAYER.
WHEEL.
APPLICATION FILED NOV. 5, 1908.
952,012.
Patented Mar. 15, 1910.
2 SHEETS—SHEET 2.
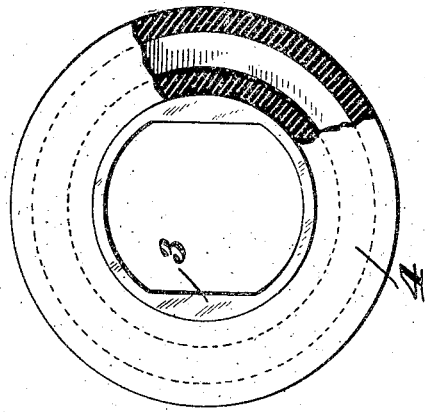
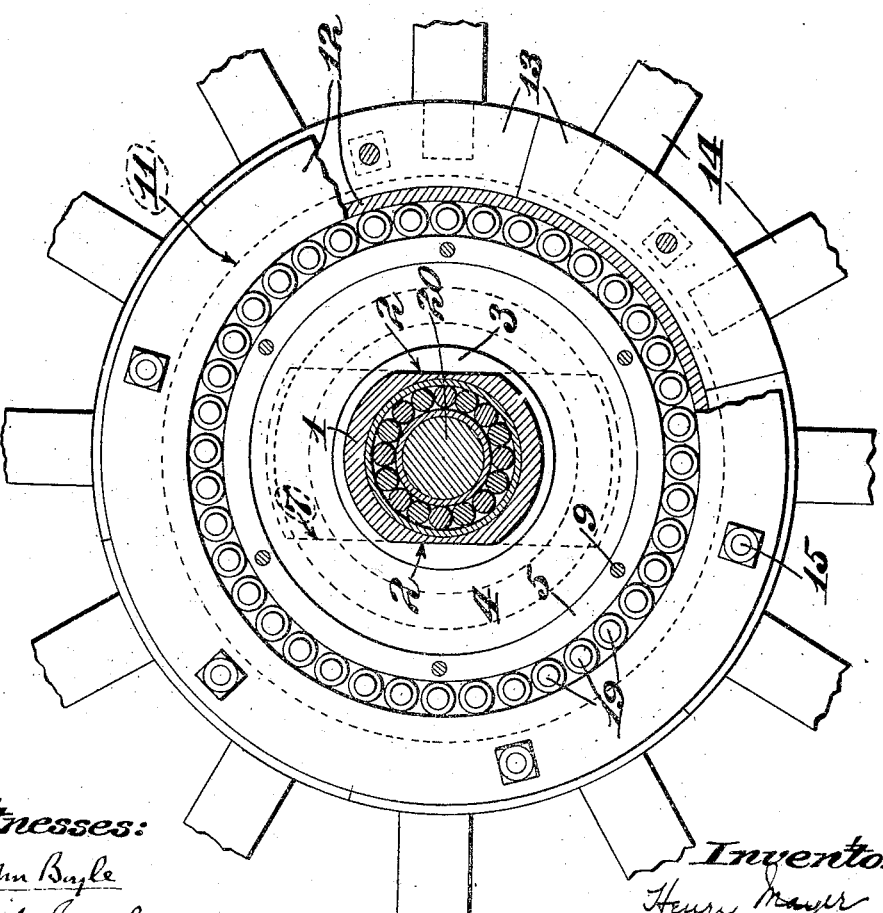
Witnesses:
John Bayle
Edgar L. Jacobs
Inventor:
Henry Mayer
By Ralph Ralph atty.

UNITED STATES PATENT OFFICE.

HENRY MAYER, OF ST. LOUIS, MISSOURI, ASSIGNOR OF ONE-HALF TO FREDERICK MAYER, OF ST. LOUIS, MISSOURI.

WHEEL.

952,012.  Specification of Letters Patent.  Patented Mar. 15, 1910.

Application filed November 5, 1908. Serial No. 461,224.

*To all whom it may concern:*

Be it known that I, HENRY MAYER, a citizen of the United States, residing at the city of St. Louis, State of Missouri, have invented a certain new and useful Improvement in Wheels, of which the following is a specification, reference being had to the accompanying drawings, forming a part of this specification, in which:—

Figure 1:
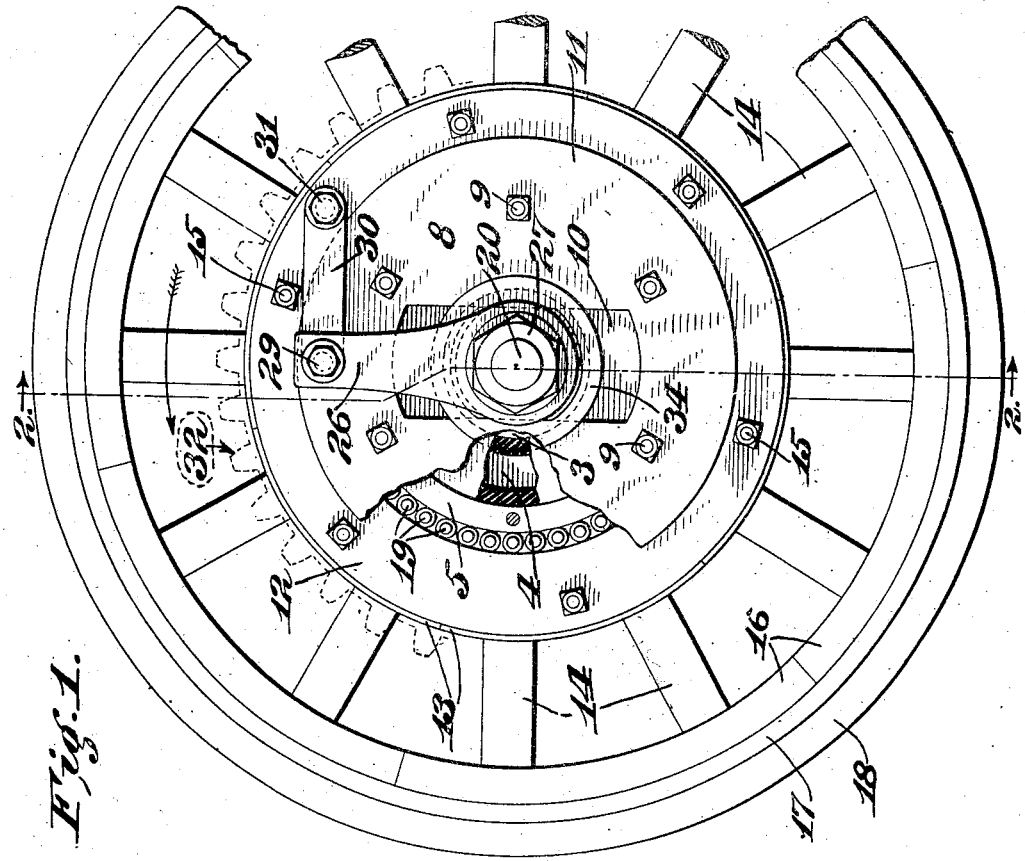
Figure 2:
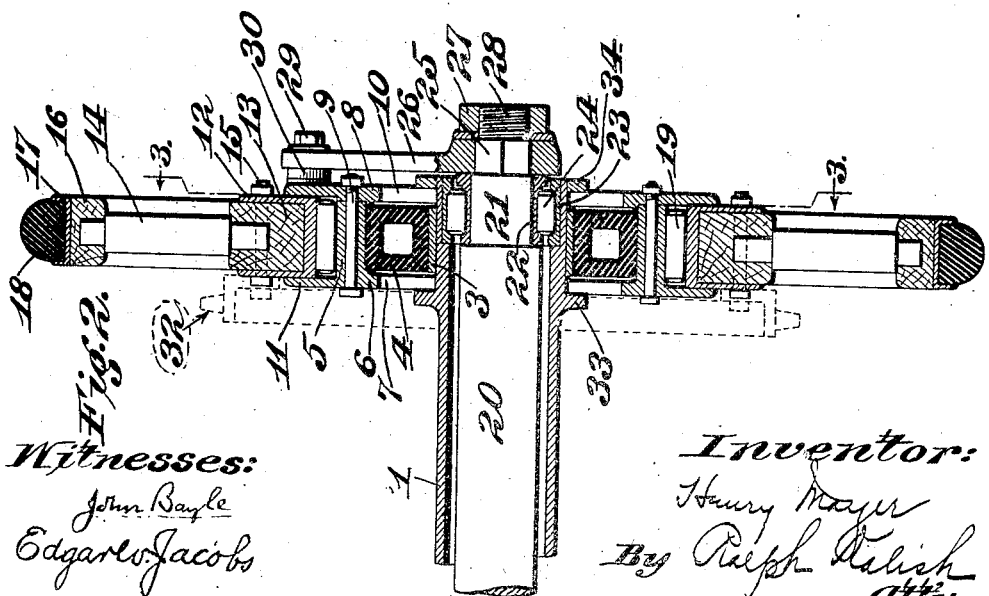

Figure 1 is a side elevational view, partly in section, of a wheel embodying my invention; Fig. 2 is a vertical sectional view on the line 2—2, Fig. 1; Fig. 3 is an enlarged sectional view on the line 3—3, Fig. 2; and Fig. 4 is a detail view of the air-cushion and its metallic bushing.

This invention relates to a new and useful improvement in wheels, the object being to construct a wheel in which a resilient cushioning device or member is arranged away from the outer rim or tread of the wheel, so as not to be in contact with the ground or other surface upon which the wheel rests.

With this object in view, my invention consists in the novel construction, arrangement, and combination of the several parts of my wheel, all as will hereinafter be described and pointed out in the claims.

In the drawings, I have shown my wheel connected to a driving device as when the same is used as a shaft-driven driving-wheel, but should the wheel be used as, for instance, a front wheel of a vehicle or wagon, no driving means need, of course, be connected thereto.

In said drawings, 1 indicates a tubular casing or axle, on which the vehicle is adapted to be suitably mounted, as by the usual springs, not shown. The outer end portion of axle 1 is preferably squared on opposite sides, as at 2, and sleeved on this squared portion is a metallic bushing 3, which may be keyed or otherwise fastened to axle 1 to prevent its moving endwise thereof, and which bushing 3 is surrounded preferably by a resilient air-tube, cylinder, or cushion 4.

Surrounding the preferably annular air-cushion 4 is a metallic ring 5, whose interior diameter is substantially the same as the outer diameter of the air-cushion 4, so as to preferably bear or rest thereagainst. Preferably this ring 5 is made integral with a circular plate or disk 6, which is slotted, as at 7, so as to slidingly fit over the squared end portion 2 of axle 1, for purposes hereinafter appearing. This plate 6 serves as a cover-plate for one side of the air-cushion 4, and a similar plate 8 is detachably secured to the opposite side of ring 5 by through-bolts 9, plate 8 being also provided with a slot 10 similar to the slot 7 in plate 6.

The construction just described constitutes a resilient hub portion or member for the outer rotatable part of the wheel, which hub portion is prevented from rotating on axle 1, but is permitted vertical movement thereon to take up any jars, shocks, and so on, to which the wheel may be subjected.

The plates 6 and 8 extend outwardly from the ring 5, so as to provide annular retaining flanges 11 for the rotatable portion of the wheel. The rotatable portion of the wheel comprises an anular grooved or channeled member 12, in which is adapted to be mounted a series of segmental filler blocks 13, from which the spokes 14 radiate, said blocks 13 being held in position in said member 12 by rivets or bolts 15. On the outer ends of spokes 14 are segmental rim members 16, and surrounding and secured on these preferably wooden rim members 16 is a metallic channel-shaped felly 17, in which is arranged an ordinary solid rubber or cushion tire 18. Interposed between the channeled member 12 and the ring 5 is a series of anti-friction rollers or other suitable anti-friction devices 19, upon which said member 12 is adapted to rest and rotate.

20 indicates a driving shaft rotatably mounted in axle 1 and which may be connected to the motor in any desirable manner, as, for instance, by an ordinary differential gear, shaft, or chain. The outer end of the driving shaft 20 is preferably reduced, as at 21, and has sleeved thereon a grooved bearing-ring 22, between which and a bearing-ring 23 on the axle 1 is placed a series of anti-friction rollers or other suitable anti-friction devices 24, so that said shaft may rotate freely and without friction in said axle 1. The end of shaft 20 outside the reduced portion 21 is preferably squared, as at 25, or otherwise suitably made to receive a driving-member or arm 26, which may be keyed or otherwise suitably secured thereon, as by a suitable nut 27 threaded on threaded end 28 of said shaft 20. The outer end of said driving-member or arm 26 is pivotally connected, as at 29, to a link 30, the opposite end of said link being pivotally connected, as at 31, to the channeled member 12 of the rotatable portion of the wheel. The shaft 20 being driven in the direction of the arrow shown in Fig. 1 will impart a rotary movement to the arm 26, and through the connecting link 30, the rotatable portion of the wheel will be rotated on the anti-friction rollers 19 in the same direction as shaft 20, the link 30, when the vehicle is being driven, exerting a constant pull upon said outer rotatable portion of the wheel. And, owing to the pivotal connection 29, the wheel is permitted to freely move vertically in the slots 7 and 10 against the resiliency of the air-cushion 4, said air-cushion thus taking up any shocks or jars to which the wheel may be subjected in passing over rough roads or other surface. I thus provide a sort of universal compensating connection between the driving shaft 20 and the rotatable or driven portion of the wheel which I have found perfectly operable and answers every requirement.

In some instances it may be desired to drive the rotatable portion of the wheel by a sprocket-chain suitably connected to the motor or other driving-medium of the vehicle, instead of having the same shaft-driven, as before described. In such cases I mount a sprocket-wheel 32 on the channeled member 12, as shown in dotted lines in Figs. 1 and 2 which may be bolted or otherwise secured to said member 12, as desired, which sprocket-wheel 32 may be connected by a sprocket-chain to a jack or other driving shaft, as is well understood.

While the bushing 3 will prevent any lateral movement of the wheel on the axle 1, as a further means for preventing such movement I provide the collar 33 for the inner side of said wheel, which collar is preferably made integral with axle 1, and for the other side of said wheel detachably thread or otherwise secure on the outer end of axle 1 a collar or nut 34.

The parts of my wheel are easily assembled, and when assembled are firmly held in proper operative position by the bolts 9 passing through ring 5 and firmly connecting and holding plates 6 and 8 together.

The outer or rotatable portion of my wheel rotates freely and with little, if any, friction on the anti-friction rollers 19, and in the case of a shaft-driven wheel, the driving-shaft 20 rotates freely and with very little, if any, friction, through the anti-friction rollers 24, in the supporting axle 1. The said slots 7 and 10 in said plates 6 and 8 permit the wheel to move vertically, and, as before stated, any shocks or jars to which the wheel may be subjected are taken up by the the air-cushion 4, the same also taking up side-thrusts and thereby further lessening the wear and tear on the vehicle.

In my construction I do away with pneumatic tires on the outer rim of the wheel, where they may be very easily, and are very frequently "punctured;" in my wheel, there is very little, if any, wear on the air-cushion 4 and there is no liability of the same being "punctured," which is now a cause of great trouble and expense in connection with, particularly, automobile wheels having the ordinary pneumatic tires on the outer rim thereof and in contact with the surface upon which the wheel rests.

I have found from experience that my wheel is strong, will not readily get out of operative order or condition, is firm, and there is no liability or danger of the automobile or other vehicle on which my wheel may be used "wabbling."

It is obvious that changes in the construction, arrangement, and combination of the several parts of my wheel might be made and substituted for those herein shown and described without departing from the nature and spirit of my invention.

Having thus described my invention, what I claim and desire to secure by Letters Patent is:

1. In a wheel, the combination with an axle having a non-circular end, of a resilient air-cushion arranged and supported on said axle, a casing arranged on said axle and closely encircling said air-cushion, said casing resting on and being supported by said air-cushion and comprising duplicate circular flat side plates 6 and 8 on each side of said air-cushion, a bearing-ring 5 integral with one of said side-plates, and bolts 9 passing laterally through said ring and side-plates to firmly secure said parts together, said side-plates being provided with co-incident vertically-disposed slots adapted to fit on and engage said non-circular end of said axle, whereby said casing is prevented from rotating on said axle, but is permitted to move vertically with respect thereto, an integral outwardly-extending annular flange on each of said side-plates, a separate tread-member loosely supported and rotatably mounted between said flanges, and anti-friction devices loosely interposed between said bearing-ring and tread-member; substantially as described.

2. In a wheel, the combination with an axle having a non-circular end, of a resilient air-tube 4 arranged and supported on said axle, a casing arranged on said axle and closely encircling said air-tube, said casing resting on and being supported by said air-tube and comprising duplicate circular flat side-plates 6 and 8 on each side of said air-tube, a bearing-ring 5 integral with one of said side-plates, and bolts 9 passing laterally through said ring and side-plates to firmly secure said parts together, said side-plates being provided with co-incident vertically-disposed slots 7 and 10 adapted to fit on and engage said non-circular end of said axle, whereby said casing is prevented from rotating on said axle, but is permitted to move vertically with respect thereto, an integral outwardly-extending annular flange on each of said side-plates, a separate tread-member loosely supported and rotatably mounted between said flanges, anti-friction devices loosely interposed between said bearing-ring and tread-member, and a bushing 3 arranged on said axle and within said casing, whereby said casing and air-tube are prevented moving laterally on said axle; substantially as described.

In testimony whereof, I have signed my name to this specification, in the presence of two subscribing witnesses.

HENRY MAYER.

Witnesses:
  JOHN BOYLE,
  EDGAR W. JACOBS.